United States Patent [19]

McDowall et al.

[11] 4,209,575
[45] Jun. 24, 1980

[54] MULTI-CELL BATTERIES

[75] Inventors: William L. McDowall, Glen Waverley; Alan K. Maplesden, Kew, both of Australia

[73] Assignee: Dunlop Austrialia Limited, Melbourne, Australia

[21] Appl. No.: 964,292

[22] Filed: Nov. 28, 1978

[30] Foreign Application Priority Data

Nov. 28, 1977 [AU] Australia ............................ PD2588

[51] Int. Cl.$^2$ ............................................. H01M 4/78
[52] U.S. Cl. .................................... 429/146; 429/149; 429/211; 429/234
[58] Field of Search ............... 429/149, 211, 234, 246, 429/160, 161, 146

[56] References Cited

U.S. PATENT DOCUMENTS

| | | | |
|---|---|---|---|
| 3,844,841 | 10/1974 | Baker | 429/160 |
| 3,941,615 | 3/1976 | McDowall | 429/149 |
| 4,022,951 | 5/1977 | McDowall | 429/149 |

*Primary Examiner*—Donald L. Walton

[57] ABSTRACT

A multi-cell battery is disclosed which comprises a stacked arrangement of frames having a number of side-by-side active paste support areas which form plates. Electrolyte-porous separator members are provided between adjacent plates in adjoining frames. The separator members are spaced from the positive active material by spacer elements which are connected to the frames and extend partly over and project from the faces of the separator members. The spacer elements are preferably inclined upwardly from their points of connection to the frames to define particle-trapping pockets.

14 Claims, 10 Drawing Figures

MULTI-CELL BATTERIES

This invention relates to a multi-cell secondary battery such as a lead acid battery.

One of the major disadvantages of current constructions of lead batteries is the high weight and cost of the cell plates formed of a lead alloy grid pasted with active material. Also because of the low mechanical strength of the lead alloys used in grids, the section of the alloys elements of the grid must be relatively large and hence the completed battery, is bulky in addition to heavy and costly.

The manufacture of conventional lead acid batteries and similar multi-cell and secondary batteries is also costly as a result of the number of separate operations involved, including the manufacture of the individual grids, the pasting of the individual grids, the assembly of the grids of differing polarity and separator members to form each cell, the assembly of the cells to a pre-formed battery case, forming the electrical connections between the cells in the case, and finally closing the case with a lid or the like. Furthermore the formation of an effective durable connection between the plates within each cell, and between assemblies of plates in adjoining cells is difficult to achieve by high volume production methods. The current trend is to make the connection between adjoining cells through an opening in the cell wall but this has produced problems in achieving a durable seal between the connecting member and the cell wall.

A unique battery construction which overcomes many of these problems is disclosed in U.S. Pat. Nos. 3,941,615 and 4,022,951.

In U.S. Pat. No. 3,941,615 there is disclosed a multi-cell battery including a plurality of frames formed of a material as herein specified, each frame defining a pluraity of material support areas arranged in side by side relationship across the width of the frame, the frames being arranged in a side by side relationship in a direction normal to the width of the frame with the portions of each frame forming the divisions between adjacent support areas secured in a sealed relationship to the corresponding portions in adjacent frames to form partitions between adjacent cells of the battery.

In a later modification of the multi-cell battery, as disclosed in U.S. Pat. No. 4,022,951, each alternate frame has an electrolyte porous separator member spanning each support area thereof and sealed to the portions of the frame defining said support area, and individual masses of active battery material supported in each support area of the remaining frame so that each said area forms a plate of the battery.

The present invention provides a further improvement in the above-referred to multi-cell battery by simplifying the construction of the separator frames to provide easier assembly of the frames and more effective operation of the battery.

There is thus provided a multi-cell battery as above described wherein a plurality of spacer elements are provided on each said alternate frame carrying separator members, each separator member having at least one spacer element extending partly over and projecting from that face of said separator member directed towards a support area of an adjoining frame carrying active material of positve polarity, thereby spacing the separator member from the positive active material.

In order to minimise the interference to the electrolyte and gas flow resulting from the provision of the spacer projections, they are preferably arranged so as to be inclined upwardly across the face of the separator member from the point of connection to the frame. This arrangement has the additional advantage that the upper side of the spacer projecting forms, with the adjoining part of the frame and the separator member, a pocket to trap particles of active material that may separate from the adjacent active plates in use. The trapping of these particles in the pockets reduces the accumulation of active material particles in the bottom of the cell that may lead to a reduction in efficiency of the cell.

All of the frames of the battery are formed from a mouldable material which is electrically insulating at the intended operating voltage of the battery, and is inert to the active materials of the battery and any material produced during operation of the battery; herein referred to as "material as herein specified". Suitable thermoplastic materials for use in the construction of frames are high impact polystyrene, ABS, and polypropylene.

Conveniently each frame is of rectangular form having a continuous perimeter member and a number of division portions parallel to two opposite sides of the frame to define the plurality of support areas. The perimeter member and division portions of adjacent frames are sealed together, and may also inter-fit, so that the perimeter member forms two opposite walls, a top, and a bottom of the battery and the division portions form the plurality of cell partitions of the battery. The adjacent frames may be arranged so that the frames are secured together by ultra-sonic weld which will also provide the required seal between the perimeter member and division portion of adjacent frames.

The frames which support the separator material may be over-all thicker than the frames supporting active material, and as the separator material is conveniently made of thin sheet material, the thicker frames provide a greater electrolyte capacity. The frame may be moulded in situ about the separator material so that the margin of the latter is embedded in the frame.

Electrically conductive elements may be embedded in the members of the frame during formation thereof and extend into the area which receives the active material to provide electrical collectors, for the active material, and if desired, the electrical connection between areas of negative and positive active material.

If frames carrying separator material are not used, and all of the frames are pasted with active material and assembled side by side, an individual separator member of porous material is inserted between the positive and negative paste in adjoining frames.

A battery formed by an assembly of frames as previously described has a number of cells determined by the number of active material areas in each frame. The adjacent active material areas in each two adjacent frames being of opposite polarity form a basic cell having a nominal voltage of 2 volts in the case of a lead acid cell. Thus the voltage and capacity of the battery is determined by the number of active material areas in each frame and the number of frames carrying active material in the assembly, respectively.

Although it is possible to electrically connect the basic cells in any desired arrangement, this construction of battery is highly suitable for connecting the basic cells formed by two adjoining frames in series, and connecting the terminals of the frames in parallel. When this arrangement of cell connections is used, suitable connector members may be located in the frame during moulding thereof to electrically interconnect the cells in the finished assembly of frames. If the basic cells formed by two frames carrying active material are to be connected in series, an intercell connector member is provided in each alternate division portion of the frame, with the intercell connector members in each frame staggered with respect to the connector members in the adjacent frame.

Also terminals elements may be located in the sides of the frames during moulding, the location and number of terminal elements being determined by the number of active material areas in the frame. If there are an even number of paste areas in each frame there is provided a terminal element at each end of each alternate frame. Where there are an odd number of paste areas in each frame there is a terminal element at alternate ends of adjacent frames. The terminal elements of individual frames are interconnected by welding to a connector strap or by other convenient means, and the battery main terminals are suitably connected thereto.

As previously indicated, the perimeter of the frames and the division portions are sealed together, with or without the provision of interfitting elements on adjacent frames so that the assembly of frames form the top, bottom, two opposite walls, and cell partitions of the battery case. The battery case is then completed by bonding cover plates to the exposed face of the two end frames of the assembly. Also suitable covers are provided if the frames have terminal elements projecting from the sides of the frames coupled by a connector strap.

Some of the advantages of the battery constructed in accordance with the present proposal are:
1. The reduction of battery weight and size by elimination of bulky lead alloy grids;
2. Elimination of forming intercell connections during assembly, with the avoidance of consequent sealing problems;
3. The possibility to eliminate a separate battery case;
4. Additional support for active material to eliminate shedding of active material;
5. Increased capacity per unit weight of battery.

The invention will be more readily understood from the following description of one practical arrangement of the invention with reference to the accompanying drawings wherein.

Figure 1:
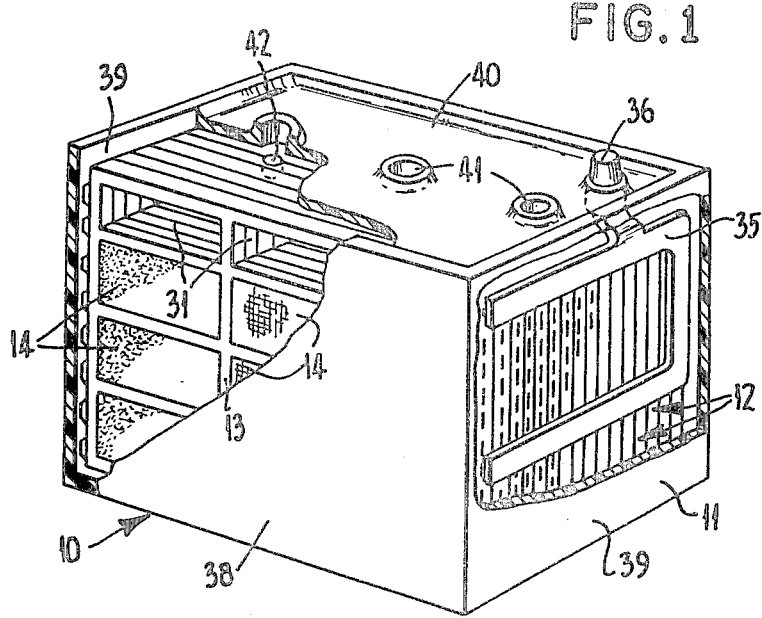
FIG. 1 is a general perspective view, partly in section, of a battery incorporating one embodiment of the present invention.

Referring now to the drawings, the battery 10 comprises a housing 11 enclosing an assembly of frame members 12 arranged and bonded together so as to form a plurality of cells 14 separated one from the other by a partition wall 13 composed of the abutting vertical elements of the respective frame members 12.

Figure 2:
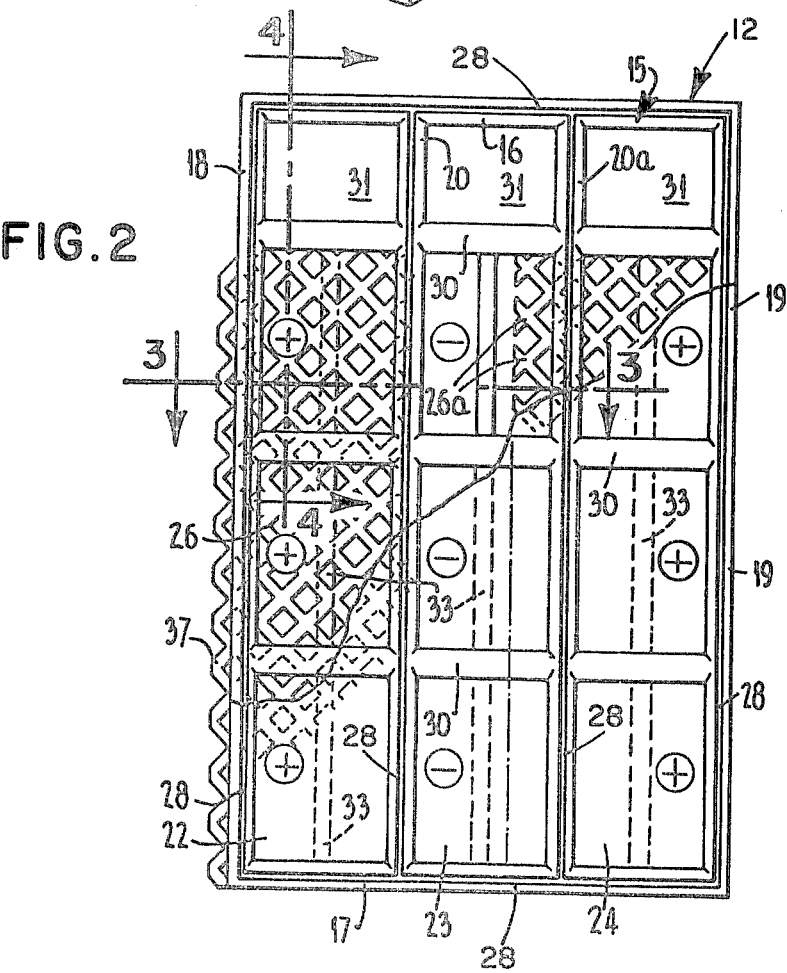
FIG. 2 is a side elevation of one grid assembly suitable for use in a battery shown in FIG. 1.

Referring now to FIG. 2, each frame member 12 comprises a perimeter member 15 having top and bottom elements 16 and 17 and opposite side elements 18 and 19. Extending between the top and bottom elements 16 and 17 are division elements 20, 20a which are parallel to the side elements 18 and 19. The perimeter member 15 and the vertical division elements 20 together define three column-like areas 22, 23 and 24 which will, in the finished battery, be pasted with appropriate active battery material to form plates.

Figure 3:
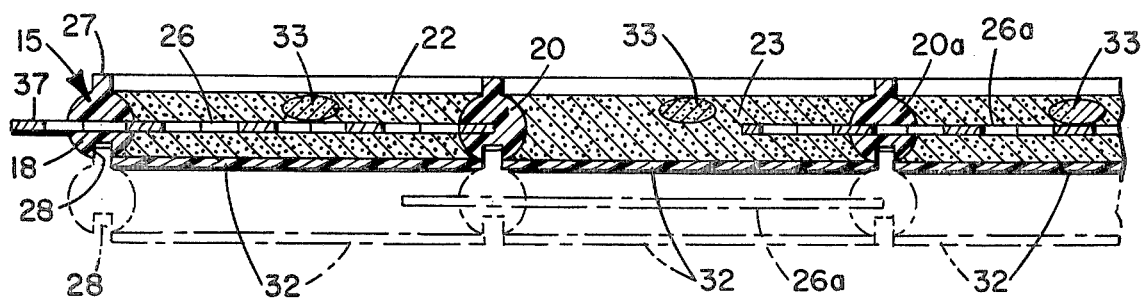
FIG. 3 is an enlarged cross-sectional view along line 3—3 in FIG. 2.
Figure 5:
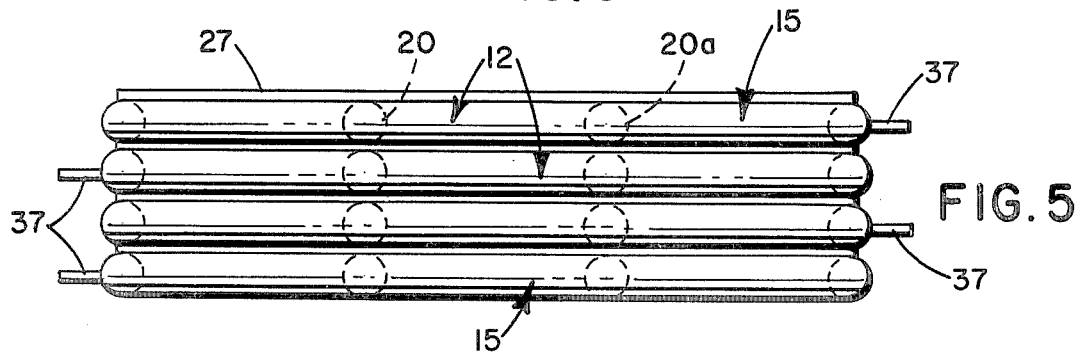
FIG. 5 is a plan view of an assembly of grids as shown in FIG. 2.

The top and bottom elements 16 and 17, the side elements 18 and 19 and the division elements 20, 20a are provided on one face with a continuous tongue 27 at right angles to the general plane of the frame, and on the opposite face a continuous groove 28, so that when a plurality of frames are assembled in side by side relationship as shown in FIGS. 3 and 5, the tongue on one frame interfits with the groove on the adjacent frame. The interfitting tongue and groove are adhered or otherwise secured together, with or without the use of additional sealing compound, so that the connection between the top and bottom elements, the side elements and division elements in respective adjacent frames will not permit the leakage of electrolyte between the cells in the finished battery. An assembly of a plurality of frames of this construction provides an open ended box-like structure with internal partitions, the sides and top and bottom of the box being formed by the inter-fitting top and side bottom elements and the partitions being formed by the interfitting division elements.

The frames 12 also include a plurality of vertically spaced horizontal support elements 30 extending between the opposite side elements 18, 19 and integral with the division elements 20, 20a. In the frame shown in FIG. 2 there are three horizontal support elements 30 and these elements are of a thickness less than the thickness of the side and division elements so that when a number of frames are assembled in a side by side relationship, the support elements in adjacent frames are spaced one from the other. The support elements 30 divide the area between the respective division elements 20, 20a so that the material subsequently located between the division elements is given additional support and will not become dislodged during service.

In the preferred form, grid-like structures 26, 26a are provided to span part or all of the area between the respective division elements to provide even further support for the active battery material in those areas which form active material areas in the finished battery. The grids may be formed of the same material as the remainder of the frame and moulded as integral parts thereof, but preferably are made of an electrically conductive material which is not adversely affected by the materials of the battery, such as lead alloy, and is embedded in the elements of the frame during the moulding of the frame.

In the embodiment shown in FIG. 2, the grid 26 extends through the side element 18 of the frame and is embedded in, but does not extend through the adjacent division element 20. The portion of the grid 26 external of the frame provides a terminal for electrically connecting the cells constituted by an assembly of frames. The grid 26a extends through the other division element 20a and is embedded in but does not extend through the side element 19. The grid 26a thus forms an intercell connector between plates 23 and 24. The grids 26 and 26a thus provide support for the active battery material, act as a current collector for the respective plates, and form intercell connectors and/or terminals as required in respect of cells formed by the assembly of frames.

During the pasting of the frames the area above the upper support element 30 in each frame is not pasted so that when the frames are assembled together electrolyte reservoirs 31 are formed as shown in FIG. 1. Also during assembly, separator strips 32 are inserted between the plates of active material in adjacent frames. The separators perform their normal function in a battery, and are made of conventional material.

Figure 7:
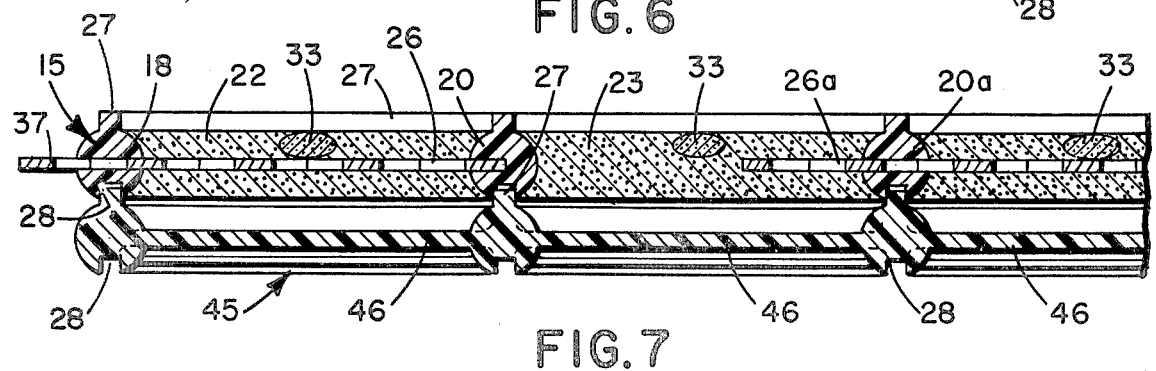
FIG. 7 is a partial sectional view of an alternative construction to that shown in FIG. 3.

In an alternative construction, as illustrated in FIG. 7, a frame 45 carrying a separator member 46 in each support area is positioned between the frames 12 described above carrying the active material. The frame 45 carrying the separator member 46 is of the same general construction as that carrying the active material, but is preferably thicker. The separator member 46, preferably made of sheet material, is sealed about the perimeter to the perimeter member 15 and to the division elements 20, 20a of the frame. All separator members 46 in a single frame 45 may be formed from a single sheet of suitable material with the frame moulded in situ on to the sheet. By suitable selection of the materials of the frame and separator the sheet material is rendered non-porous where it is embedded in the division elements 20, 20a of the frame 45 to prevent leakage of electrolyte between adjoining cells of the finished battery via the common separator sheet. The separator may be formed of a material which will fuse under heat so that during moulding the portions of the sheet contacted by the hot frame material are fused to render it non-porous.

In order to assist the gas, generated when the battery is in use, to escape from between the plates, vent strips 33 made of porous material extend vertically through the mass of active material forming each plate. The vent strip may be added to the frame prior or during the pasting operation, or may be located in the mould during moulding of the frame so that the vent is bonded to the support elements 30.

In order to form a battery such as is shown in FIG. 1, a plurality of frames of the construction shown in FIG. 2 are individually pasted with conventional active battery material so that the adjacent areas in each frame are of opposite polarity. Thus each frame forms a plurality of side by side plates of alternate positive and negative polarity. A number of these frames are then assembled together in a side by side relationship with each plate in each frame, adjacent a plate of opposite polarity in the adjoining frame. In assembling the frames, the tongues and grooves on adjacent frames inter-fit and are sealed together. The series of cells so formed by each two adjacent frames are electrically connected in series by the grids, such as 26a and have positive and negative terminal tags 37 at respective ends as seen in FIG. 5. The terminal tags 37 at opposite ends of the assembly of frames are then connected to respective connector straps 35 which carry the main terminals such as 36.

Although the assembly of frames will form a top, bottom and two opposite side walls, the remaining two sides include exposed active material and the two side plates 38 are secured to these two sides to complete the battery case. In some applications it is also desirable to provide cover plates 39 for the terminal tags and connector straps, and these cover plates may be secured to the side plates 38. The cover 40 is also provided with openings 41 which align with openings 42 which have been cut into the top face of the assembly of frames, to enable the introduction of electrolyte to each cell of the battery.

It will be appreciated that by suitable adaption of the construction of the frames, the cover plates and/or top cover may not be required.

Figure 6:
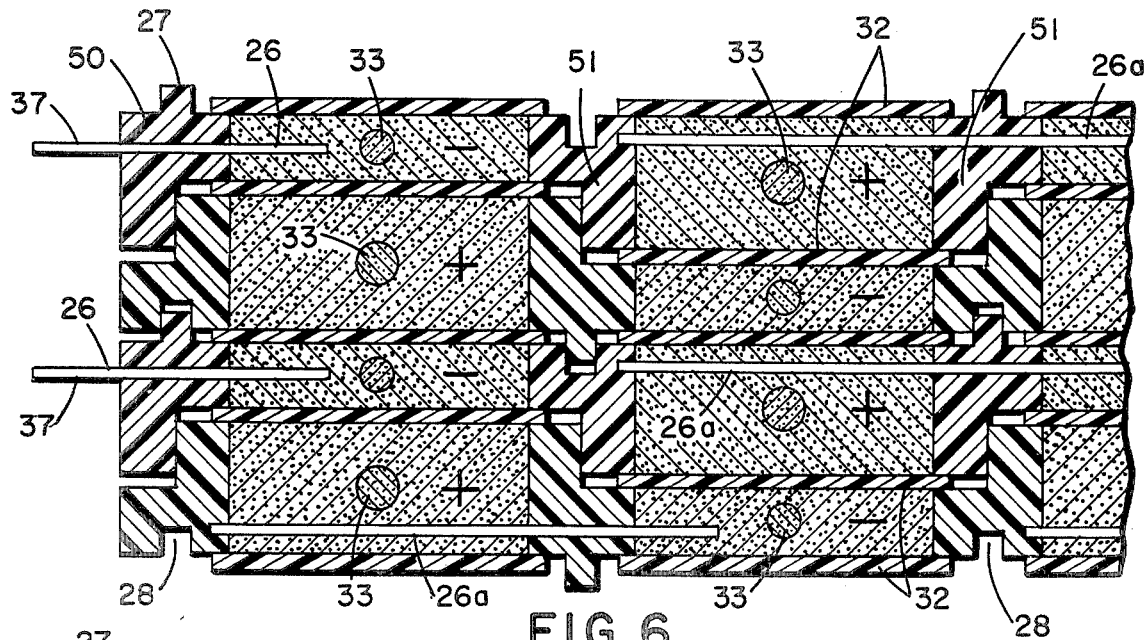
FIG. 6 is a partial sectional view of an alternative construction of the grid.

Referring now to FIG. 6, there is here shown a horizontal section through an assembly of frames of a battery of the same basic construction as previously described, but wherein the individual frames are of an alternative construction. The side element 50 and division element 51 are each of step shaped cross section arranged so that in assembly the step shaped section inter-fit. In addition the stepped shape of the element results in the frame having alternate thick and thin active material receiving areas, and as a greater mass of positive active material is required in a normal battery than negative active material, the thick area of the frame may be pasted with positive active material and the thin area with negative active material.

Figure 4:
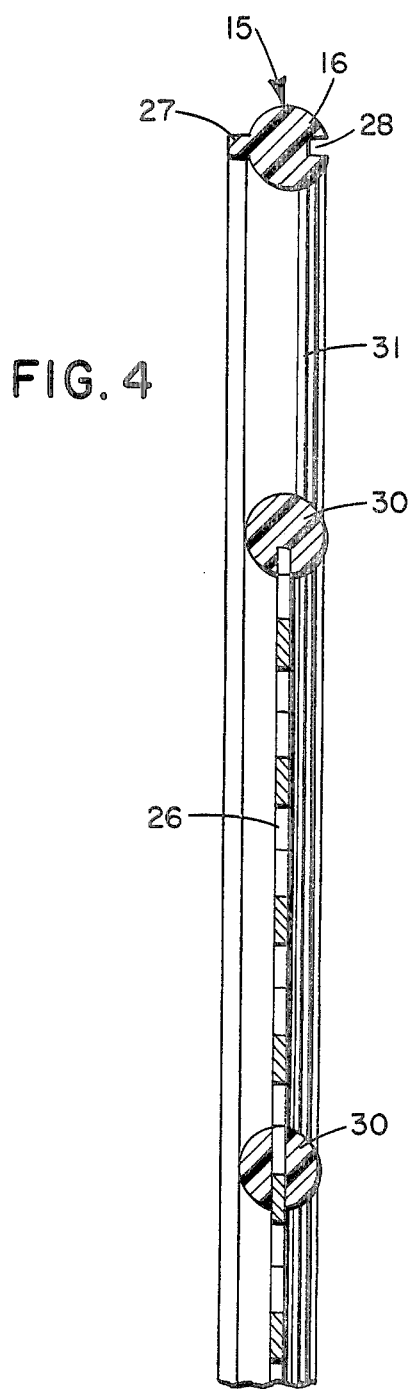
FIG. 4 is an enlarged sectional view along the line 4—4 in FIG. 2.

The arrangement of the current collectors, intercell connectors, terminal tags and separator strips is the same as previously described with reference to FIGS. 2 to 4. The frames are also provided with tongue and groove elements 27,28 that inter-fit on assembly of the frames (as with frames 42) to locate and hold the frames, and provide a sealed joint between the cells in the finished battery.

Figure 9:
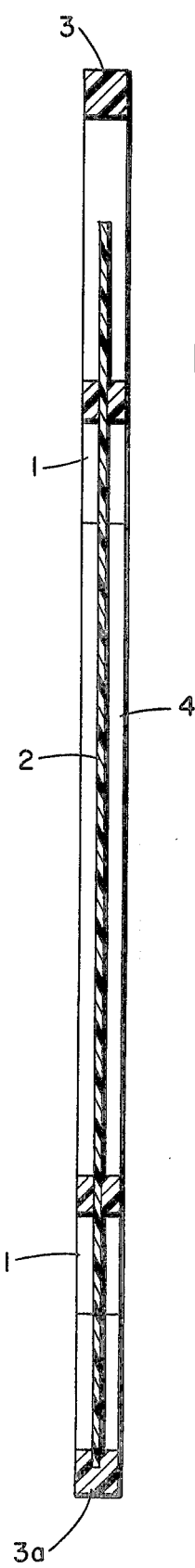
FIG. 9 is a sectional view along line 9—9 in FIG. 8.
Figure 8:
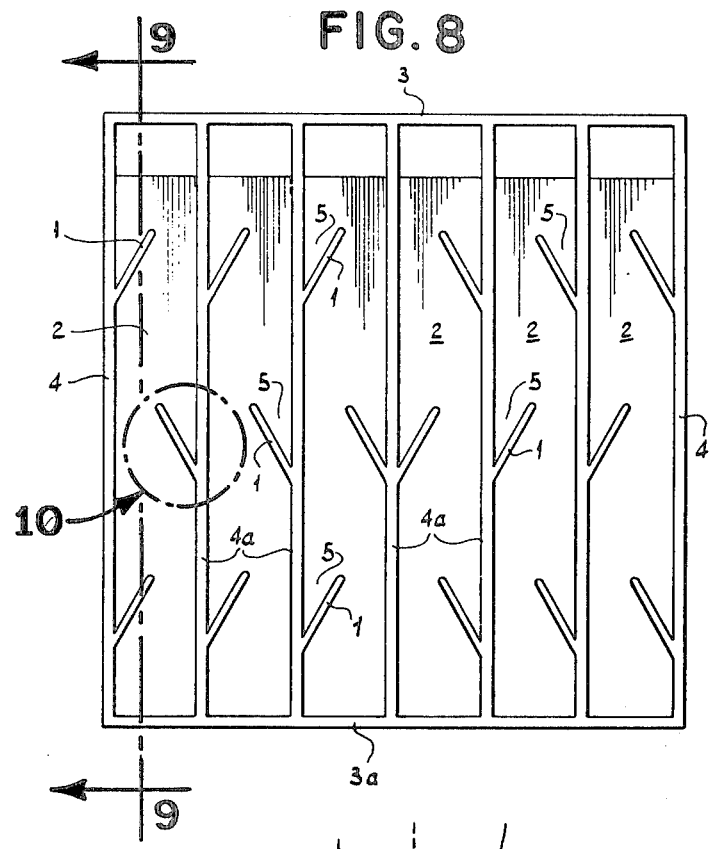
FIG. 8 is a side elevation of a separator frame suitable for use in the construction of battery described with reference to FIG. 7.
Figure 10:
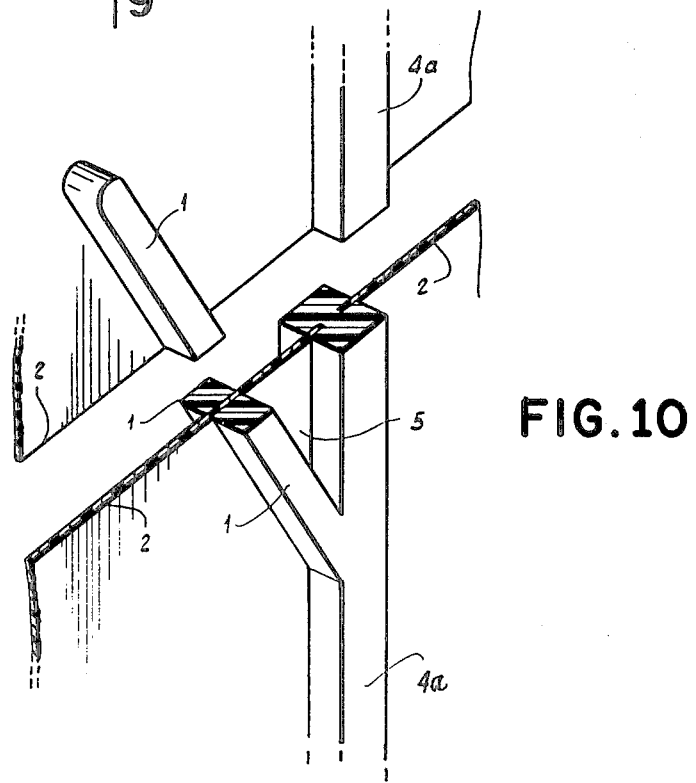
FIG. 10 is an enlarged perspective view of the portion of the frame indicated at 10 inside the dot-dash circle in FIG. 8.

Reference has been made in this specification to the use of individual frames to support the separator material between the areas of active material in adjacent frames carrying same. In order to avoid the cost of production of individual frames carrying the separator material, the frames carrying the active material may be shaped to form, when two such frames are assembled side by side, a recess to receive the marginal edges of a separator member 32 located between the areas of active material in adjacent frames. The marginal edges of the separator member may be bonded to the portions of the frames defining the recess. This bonding may be effected in the same operation employed to secure the frames together, such as ultra-sonic welding of the frames.

Where it is desired to use independent frames carrying the separator material, a preferred construction of the separator frame to use is illustrated in FIGS. 8 to 10 of the accompanying drawings.

This separator frame is moulded from a suitable plastic material and has a rectangular boundary frame having opposite vertical sides 4 and a top and bottom 3 and 3a respectively. A plurality of division portions 4a extend between the top and bottom of the frame and parallel to the sides 4. In the drawing there are five partition portions thus providing six separator support areas so that the frame may be used in a six cell battery.

The frame is moulded in situ on a prearranged formation of separator members 2, each comprising a plain sheet form made from any suitable known separator material. The moulding of the frame results in the separator members being joined together into a unitary structure within the frame with the edges of the separator members embedded and secured in the sides and/or division portions of the frame. As can be seen in FIG. 3 the separator members in adjacent support areas of the frame are isolated from one another so that in the finished battery there is no passage of electrolyte between the cells.

In an alternative construction the separator members 2 are initially in the form of a single sheet. The frame is moulded in situ on the separator sheet 2 from plastic material. During the moulding operation the frame material fuses with the separator sheet to render those positions of the sheet within the frame elements nonporous.

During the moulding of the frame there are also formed a plurality of pairs of spacer projections 1 on opposite sides of each separator member 2. The spacer projections extend upwardly and part-way across the width of the separator member. As can be seen in FIG. 3 the spacer projections of each pair are located symmetrically on opposite sides of the separator member with the separator member extending completely therethrough.

As can be seen in FIGS. 8 and 10, the spacer projections form with the sides of the frame 4, or the division partitions 4a, an upwardly open V-shaped pocket 5. In the embodiment illustrated, three such pockets are provided on each side of each separator member 2. It will thus be appreciated that any active battery material particles which break free from the face of the active plates, at a level above any one of the V-shaped recesses, will probably become trapped in the recess and hence not fall to the bottom of the battery. In order to reduce the likelihood of such particles falling to the bottom of the batteries, each spacer projection 1 extends across at least half the width of the separator member 2. This ensures that there is no clear unobstructed vertical path for particles to fall from the top to the bottom of the separator frame.

In the embodiment shown there are six separator members 2 in each frame, and thus it is desirable to provide spacer projections 1 on both sides of each separator member. This ensures that irrespective of which direction the separator frame is assembled into the battery, spacer projections will always be directed towards the areas of positive active material in the frames on either side of the separator frame. However some saving in materials is possible in batteries having an odd number of cells. In such an arrangement, the spacer projections need only be provided on one side of the separator member 2 in each cell with the spacer projections being on opposite sides of the separator member in adjoining cells. Such separator frames are then assembled in the battery with alternate separator frames oppositely positioned. However it must be appreciated that this arrangement of spacer projections is not suitable for frames to be incorporated in batteries having an even number of cells.

The provision of the spacer projections 1 enable the separator member to be made from strip or sheet material having flat opposite faces, as distinct from the material currently used in conventional batteries having longitudinal ribs or ridges on one face. These ribs or ridges do present manufacturing problems, such as maintaining the strip or sheet flat. Also the spacer projection reinforces the separator material against distortion in service, and provides for the possible use of thin strip or sheet material.

We claim:

1. A multi-cell battery including a plurality of frames formed of a mouldable material which is electrically insulating at the intended operating voltage of the battery and is inert to the active materials of the battery and any material produced during operation of the battery, each frame defining a plurality of separate material receiving areas arranged in side by side relationship across the width of the frame, each frame including portions forming divisions between adjacent support areas of the frame, the frames being arranged in a side by side relationship in a direction normal to the width of the frame with the portions of each frame forming the divisions between adjacent receiving areas secured in a sealed relationship to the corresponding portions in adjacent frames to form partitions between adjacent cells of the battery, each alternate frame having an electrolyte porous separator member spanning each support area thereof and secured to the portions of the frame defining said support area, and individual masses of active battery material supported in each support area of the remaining frames so that each said area forms a plate of the battery, the active battery material in respective areas being selected so that adjacent areas in each frame form plates of opposite polarity and adjacent areas on opposite sides of each separator member form plates of opposite polarity, each said alternate frame having a plurality of spacer elements integral therewith, said spacer elements being arranged so that each spacer member has at least one spacer element extending partly across that surface of the separator member directed to the support area of an adjacent frame carrying active material of positive polarity.

2. A battery as claimed in claim 1 wherein electric connector members extend through alternate division portions of the frames supporting active battery material the arrangement of the connector members being such that each two adjacent frames supporting active battery material form a series connected battery having a number of cells equal to the number of division portions plus one.

3. A battery as claimed in claim 1 wherein at least some of the frames supporting active battery material include a terminal member extending from the active battery material of a plate at one side of the frame through said side of the frame, and a connector member extends through each alternate division portion of the frame counted from said one side to electrically connect the plates of opposite polarity separated by said alternate division portions.

4. A battery as claimed in claim 1 wherein the frame members are adapted to inter-fit one with the other when assembled in the side by side relation.

5. A battery as claimed in claim 2 wherein at least some of the frames supporting active battery material include a terminal member extending from the active battery material of a plate at one side of the frame through said side of the frame, and a connector member extends through each alternate division portion of the frame counted from said one side to electrically connect the plates of opposite polarity separated by said alternate division portions.

6. A battery as claimed in any one of claims 1, 2, 3, 4 or 5 wherein each separator member is a sheet or strip having the opposite surfaces thereof flat.

7. A multi-cell battery as claimed in claim 6 wherein said spacer elements are provided to extend over and project from each of the opposite surfaces of each separator member.

8. A multi-cell battery as claimed in claim 7 wherein each spacer element extends in an upwardly inclined direction from the area of connection with the frame to form with the frame and separator member an upwardly open pocket.

9. A multi-cell battery as claimed in claim 8 wherein the spacer elements on each opposite surface of the separator member are spaced from each other in the vertical direction with alternate spacer elements extending inwardly from the frame at opposite vertical edges of the separator member.

10. A multi-cell battery as claimed in claim 7 wherein the frame and spacer elements are moulded in situ on to a sheet of material forming the separator member in each support area of the frame so that during the moulding a seal is formed through the sheet material within the division portions of the frame to prevent the passage of electrolyte through the division portions.

11. For use in a multi-cell battery as claimed in claim 1 as the alternate frame, a frame of rectangular shape having a continuous perimeter member and a plurality of division portions parallel to the opposite sides to define with the perimeter frame a plurality of side by side support areas, electrolyte porous separator members spanning each support area and secured to portions of the frame defining the respective support areas, and a plurality of spacer elements formed integral with the frame extending partly across and projecting from that face of each separator member which upon assembly to form a battery is directed toward a support area of an adjoining frame carrying positive active material.

12. A frame as claimed in claim 11 wherein said spacer elements are provided to extend over each face of each separator member in the frame.

13. A frame as claimed in claim 11 or 12 wherein the frame and spacer elements are moulded in situ about the separator member.

14. A multi-cell battery as claimed in claim 8 wherein the frame and spacer elements are moulded in situ on to a sheet of material forming the separator member in each support area of the frame so that during the moulding a seal is formed through the sheet material within the division portions of the frame to prevent the passage of electrolyte through the division portions.

* * * * *